(12) United States Patent
Sueishi

(10) Patent No.: US 10,850,568 B2
(45) Date of Patent: Dec. 1, 2020

(54) TWO-WHEELED VEHICLE TIRE

(71) Applicant: Sumitomo Rubber Industries, Ltd., Kobe (JP)

(72) Inventor: Makoto Sueishi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 335 days.

(21) Appl. No.: 15/799,345

(22) Filed: Oct. 31, 2017

(65) Prior Publication Data
US 2018/0134092 A1    May 17, 2018

(30) Foreign Application Priority Data
Nov. 17, 2016   (JP) ................................. 2016-224329

(51) Int. Cl.
*B60C 11/11*   (2006.01)
*B60C 11/03*   (2006.01)

(52) U.S. Cl.
CPC ........... *B60C 11/11* (2013.01); *B60C 11/0302* (2013.01); *B60C 2200/10* (2013.01); *B60C 2200/14* (2013.01)

(58) Field of Classification Search
CPC .............................. B60C 11/11; B60C 11/0302
See application file for complete search history.

(56) References Cited

U.S. PATENT DOCUMENTS

2005/0139303 A1* 6/2005 Hirose ................. B60C 11/032
152/209.15
2008/0110541 A1* 5/2008 Sueishi .................. B60C 11/11
152/209.15

FOREIGN PATENT DOCUMENTS

EP       1923236 A1    5/2008
JP    2005-193784 A    7/2005

OTHER PUBLICATIONS

Extended European Search Report, dated Apr. 24, 2018, for European Application No. 17198558.3.

* cited by examiner

*Primary Examiner* — Steven D Maki
(74) *Attorney, Agent, or Firm* — Birch, Stewart, Kolasch & Birch LLP

(57) ABSTRACT

A two-wheeled vehicle tire includes a tread portion having a designated rotational direction and being provided with at least three kinds of blocks including first blocks each having a trailing edge extending substantially in parallel with a tire axial direction, second blocks each having a trailing edge inclined a first direction with respect to the tire axial direction and third blocks each having a trailing edge inclined in a second direction opposite to the first direction with respect to the tire axial direction. At least two different kinds of blocks selected from a group of the first blocks, the second blocks and the third blocks are provided on each of a crown region, middle regions and shoulder regions of a tread portion.

16 Claims, 2 Drawing Sheets

TWO-WHEELED VEHICLE TIRE

BACKGROUND ART

Field of the Invention

The present invention relates to two-wheeled vehicle tires, and more particularly to a two-wheeled vehicle tire with a tread portion provided with a plurality of blocks.

Description of the Related Art

As one of conventional two-wheeled vehicle tires which are suitable for running on rough terrain, a tire having a tread portion provided with a plurality of blocks have been known. Such a two-wheeled vehicle tire has been requested to exhibit adequate grip performance on both hard and soft terrain conditions at a high level.

Japanese Unexamined Patent Application Publication No. 2005-193784, for example, discloses a two-wheeled vehicle tire with tread blocks each having a top surface with an oblique leading edge inclined with respect to both tire axial and circumferential directions.

Although the tire disclosed in the above patent publication exhibits improved grip on soft terrain, the tire unfortunately exhibits poor grip performance on hard terrain.

SUMMARY OF THE INVENTION

The present invention has been made in view of the above circumstances, and has a main object to provide two-wheeled vehicle tires that may exhibit adequate grip performance on both hard and soft terrain conditions at a high level.

In one aspect of the invention, a two-wheeled vehicle tire includes a tread portion having a designated rotational direction and being provided with a plurality of blocks. The tread portion includes a crown region with a tire equator wherein the crown region is a region that comes into contact with the ground when straight traveling and when cornering with a small camber angle, a pair of middle regions each located axially outwardly of the crown region wherein the middle regions are regions that come into contact with the ground when cornering and a pair of shoulder regions each located axially outwardly of the shoulder regions wherein the shoulder regions are regions that come into contact with the ground when cornering with a large camber angle. Each of the blocks has a top surface with a straightly extending trailing edge located backwardly in the rotational direction. The blocks include at least three kinds of blocks including first blocks each having the trailing edge extending substantially in parallel with a tire axial direction, second blocks each having the trailing edge inclined in a first direction with respect to the tire axial direction and third blocks each having the trailing edge inclined in a second direction opposite to the first direction with respect to the tire axial direction. At least two different kinds of blocks selected from a group of the first blocks, the second blocks and the third blocks are provided on each of the crown region, middle regions and shoulder regions.

In another aspect of the invention, a total number of the first blocks may be the least in the three kinds of blocks.

In another aspect of the invention, a total number of the first blocks may be in a range of from 10% to 40% of a total number of the blocks, a total number of the second blocks may be in a range of from 30% to 50% of the total number of the blocks, and a total number of the third blocks may be in a range of from 30% to 50% of the total number of the blocks.

In another aspect of the invention, in the crown region, with respect to a number of the block provided on the crown region, a number of the first blocks may be in a range of from 20% to 60%, a number of the second blocks may be in a range of from 20% to 40%, and a number of the third blocks may be in a range of from 20% to 40%.

In another aspect of the invention, in each of the middle regions, with respect to a number of the blocks provided on the middle region, a number of the first blocks may be in a range of from 0% to 30%, a number of the second blocks may be in a range of from 30% to 60%, and a number of the third blocks may be in a range of from 30% to 60%.

In another aspect of the invention, in each of the shoulder region, with respect to a number of the blocks provided on the shoulder region, a number of the first blocks may be in a range of from 20% to 60%, a number of the second blocks may be in a range of from 20% to 40%, and a number of the third blocks may be in a range of from 20% to 40%.

In another aspect of the invention, the trailing edges of the first blocks may be inclined at first angles in a range of less than 5 degrees with respect to the tire axial direction, the trailing edges of the second blocks may be inclined at second angles in a range of more than 5 degrees with respect to the tire axial direction, and the trailing edges of the third blocks may be inclined at third angles in a range of more than 5 degrees with respect to the tire axial direction.

In another aspect of the invention, in each of a half tread region from the tire equator to a tread edge, the crown region may be a region from the tire equator to a location less than 25% of a tread half width, the middle region may be a region away 25% of the tread half width from the tire equator and within 75% of the tread half width from the tire equator, and the shoulder region may be a region away 75% or more of the tread half width from the tire equator.

In another aspect of the invention, each of the blocks may have a height in a range of from 4 to 19 mm, and a distance between adjacent top surfaces of a pair of the blocks may be in a range of from 8 to 30 mm.

In another aspect of the invention, the tread portion may have a land ratio in a range of from 5% to 35%.

In another aspect of the invention, a motorcycle may include a two-wheeled vehicle tire according to claim 1 as a front tire.

DESCRIPTION OF THE PREFERRED EMBODIMENTS

An embodiment of the present invention will be explained below with reference to the accompanying drawings.

Figure 1:
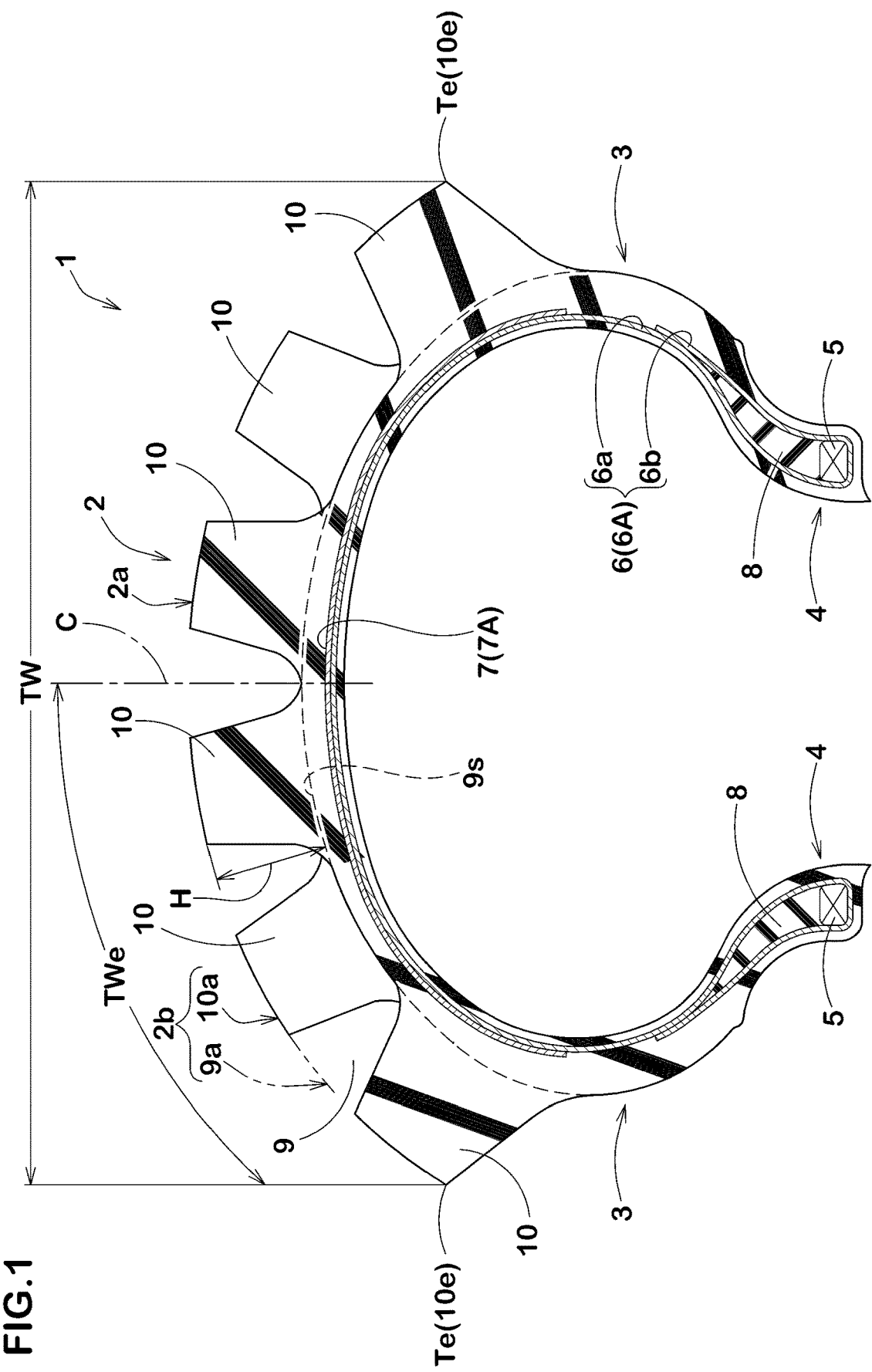
FIG. 1 is a cross-sectional view of a two-wheeled vehicle tire according to one embodiment of the present invention.
Figure 2:
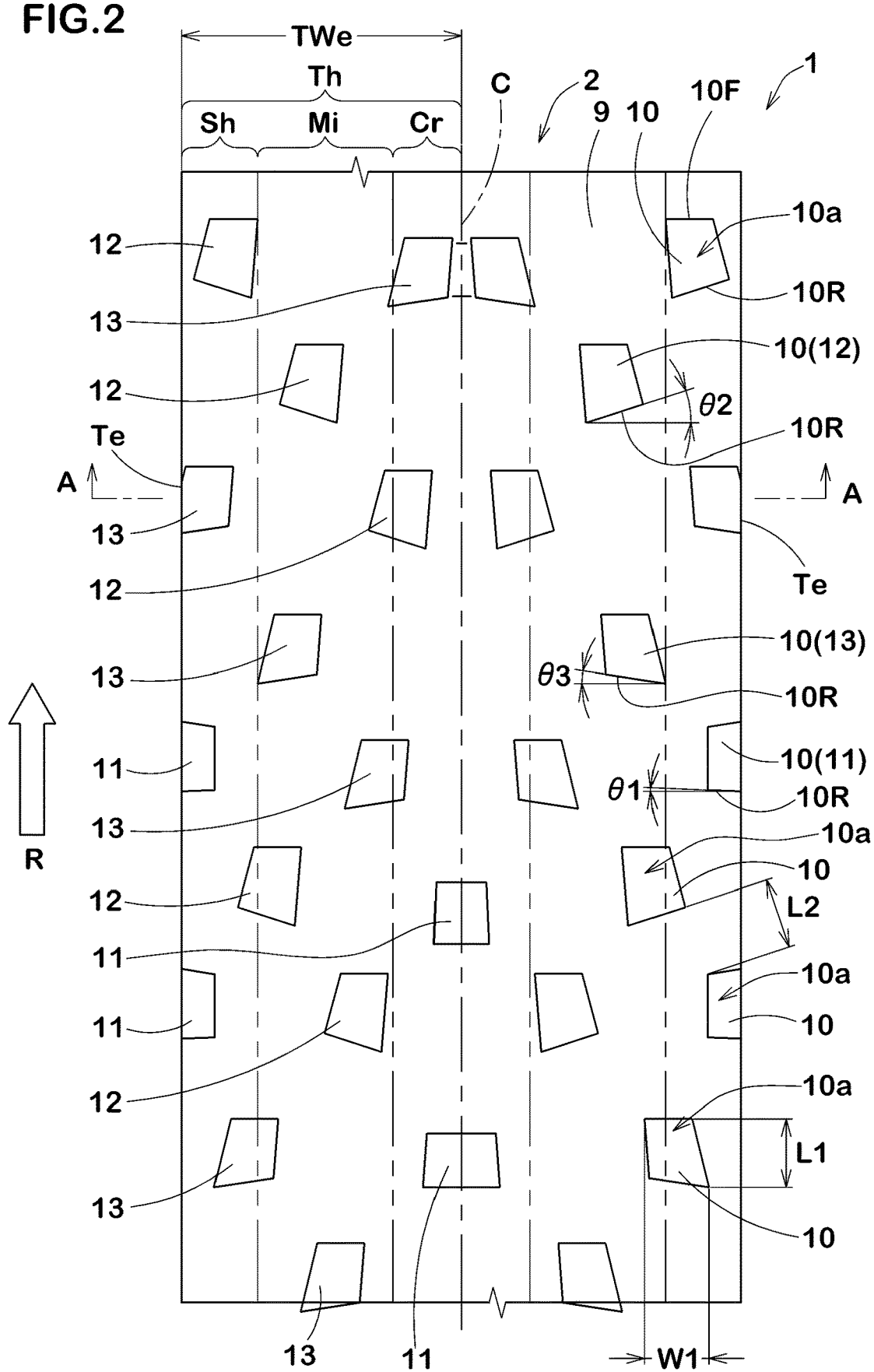
FIG. 2 is a development view of a tread portion of the two-wheeled vehicle tire as illustrated in FIG. 1.

FIG. 1 illustrates a cross-sectional view including a tire axis of a two-wheeled vehicle tire 1 (hereinafter simply referred to as "tire") 1 under a standard condition in accordance with an embodiment of the present invention. FIG. 2 illustrates a development view of a tread portion 2 of the tire 1 as illustrated in FIG. 1. FIG. 1 corresponds to a cross-section taken along the lines A-A of FIG. 2. The tire 1, for example, may preferably be embodied as a front tire for motorcycles that are suitable for running on rough terrain, e.g., motocross bikes.

As used herein, the standard condition is such that the tire 1 is mounted on a standard wheel rim (not illustrated) with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 in accordance with the present embodiment includes a carcass 6 extending between bead cores 5 of bead portions 4 via the tread portion 2 and sidewall portions 3 and a tread reinforcing layer 7 disposed outside the carcass 6 in the tire radial direction in the tread portion 2.

The carcass 6, for example, is configured as one carcass ply 6A. The carcass ply 6A includes a main portion 6a extending between the bead cores 5 disposed in the bead portions 4 via the tread portion 2 and the sidewall portions 3, and a pair of turn-up portions 6b each turned up around the bead core 5.

The carcass ply 6A includes carcass cords which are oriented at angles of preferably 75 to 90 degrees, more preferably 80 to 90 degrees with respect to the tire equator C. As the carcass cords, an organic fiber cord, e.g., nylon, polyester or rayon may preferably be employed.

Preferably, a bead apex rubber 8 is disposed between the main portion 6a and the turn-up portion 6b in each of the bead portions 4. The bead apex rubber 8, for example, is made of a hard rubber composition, leading to reinforce the bead portions 4 effectively.

The tread reinforcing layer 7, for example, is configured as a one reinforcing ply 7A. The reinforcing ply 7A, for example, includes reinforcing cords which are oriented at angles of 5 to 40 degrees with respect to the tire equator C. As the reinforcing cords, for example, steel, aramid or rayon cord may preferably be employed.

Preferably, the outer surface 2a of the tread portion 2 between tread edges Te may be formed into a substantially arc shape protruding outwardly in the tire radial direction to be obtained a sufficient ground contact area even when cornering with a large camber angle. In this embodiment, the tread width TW, which is a distance in the tire axial direction between the tread edges Te, corresponds to the tire maximum width.

As used herein, the tread edge Te on each side of the tread portion 2 is defined as an axially outer edge 10e of the top surface 10a of the block 10 that is arranged outermost in the tire axial direction.

As illustrated in FIG. 2, the tread portion 2 includes a crown region Cr, a pair of middle regions Mi and a pair of the shoulder regions Sh.

In this embodiment, the crown region Cr includes the tire equator C, and is a region that comes into contact with the ground when straight traveling and when cornering with a small camber angle. In each of a half tread region Th from the tire equator C to one of the tread edges Te, the crown region Cr, for example, may be a region from the tire equator C to a location less than 25% of the tread half width TWe.

As used herein, the tread half width TWe is a distance from the tire equator C to one of the tread edges Te in the tire axial direction measured along a tread ground contact surface 2b, as illustrated in FIG. 1. As used herein, the tread ground contact surface 2b is defined as a surface that is formed by the top surfaces 10a of the blocks 10 and virtual outer surfaces 9a obtained by filling up all grooves 9 formed among the blocks 10 up to the same height of the blocks 10.

As illustrated in FIG. 2, each of the middle regions Mi is a region located axially outwardly of the crown region Cr, wherein the middle region Mi is a region that comes into contact with the ground when cornering regardless of the camber angle. In each of the half tread region Th, the middle region Mi, for example, is a region away 25% of the tread half width TWe from the tire equator C and within 75% of the tread half width TWe from the tire equator C.

In this embodiment, each of the shoulder regions Sh is a region located axially outwardly of each of the middle regions Mi, wherein the shoulder region Sh is a region that typically comes into contact with the ground when cornering with a large camber angle. In each of the half tread region Th, the shoulder region Sh, for example, is a region away 75% or more of the tread half width TWe from the tire equator C.

In some preferred embodiments, a plurality of blocks 10 is provided on each of the crown region Cr, the middle regions Mi and the shoulder regions Sh of the tread portion 2. In some preferred embodiments, the blocks 10 may be arranged in a line-symmetrical manner with respect to the tire equator C.

In some preferred embodiments, the tread portion 2 may be provided with relatively few blocks so as to have a land ratio in a range of from 5% to 35%. When the land ratio of the tread portion 2 is less than 5%, a crack may occur locally on the base of some blocks 10 since bending moment or shearing force acting on each block 10 increases when traveling on hard terrain. When the land ratio of the tread portion 2 is more than 35%, grip performance on soft terrain may be deteriorated since the blocks 10 may not dig into mud sufficiently.

In some preferred embodiments, some of the blocks 10, in the development view, may be formed into a substantially rectangular shape. Furthermore, in each of the blocks 10, the top surface 10a, for example, may be formed into a substantially flat plane.

Preferably, the widths W1 of the top surfaces 10a of the blocks 10 in the tire axial direction may be in a range of 10% to 30% of the tread half width TWe. Preferably, the circumferential lengths L1 of the top surfaces 10a of the blocks 10 may be in a range of from 0.5 to 2.0 times the width W1 of the block 10.

As illustrated in FIG. 1, the blocks 10 preferably have a block height H, which is measured from the bottom lines 9s of the grooves 9 to the top surface 10a, in a range of from 4 to 19 mm. When the block height H is less than 4 mm, grip performance on soft terrain may be deteriorated since the blocks 10 may not dig into mud sufficiently. When the block height H is more than 19 mm, grip performance on hard terrain may de deteriorated since rigidity of the block 10 tends to decrease.

As illustrated in FIG. 2, in each tread half region Th, each of the distances L2 between top surfaces 10a of two adjacent blocks 10 is preferably in a range of from 8 to 30 mm. When the above distance L2 is less than 8 mm, grip performance of the tire on soft terrain may be deteriorated since mud and the like entered into the grooves 9 among the blocks 10 tends to be held therein and not be released easily therefrom. When the above distance L2 is more than 30 mm, a crack may occur locally on the base of some blocks 10 since bending moment or shearing force acting on each block 10 increases when running on hard terrain.

In this embodiment, the tire 1 may have a designated rotational direction R. Thus, the top surface 10a of each of the blocks 10 includes a leading edge 10F located forwardly in the rotational direction R and a trailing edge 10R located backwardly in the rotational direction R. In some preferred embodiments, the leading edge 10F and the trailing edge 10R may extend in a straight manner.

The blocks 10 include at least three kinds of blocks in which inclination manner of the trailing edges 10R with respect to the tire axial direction are different from each other, wherein the three kinds of blocks include first blocks 11, second blocks 12 and third blocks 13.

In this embodiment, the first blocks 11 have the trailing edges 10R extending in substantially parallel with the tire axial direction. In some preferred embodiments, as to the "substantially parallel with the tire axial direction", the trailing edges 10R of the first blocks 11 may have first angles $\theta 1$ equal to or less than 5 degrees with respect to the tire axial direction.

The first blocks 11 as such may keep better balance between grip performance on soft terrain and on hard terrain. Further, the first blocks 11 may be helpful to improve grip performance on hard terrain when straight traveling ahead since the trailing edges 10R substantially extend perpendicularly with respect to a direction of reacting force from the ground when straight traveling ahead.

In this embodiment, the second blocks 12 have the trailing edges 10R inclined in a first direction with respect to the tire axial direction. Preferably, the trailing edges 10R of the second blocks 12 are inclined in the first direction at second angles $\theta 2$ more than 5 degrees with respect to the tire axial direction. In some preferred embodiment, the second angles $\theta 2$ may be equal to or less than 40 degrees.

The second blocks 12, for example, have the trailing edges 10R each inclined such that an axially outer side of the trailing edge 10R is located forwardly in the rotational direction R with respect to an axially inner side thereof. The second blocks 12 as such may have excellent mud-discharging property by discharging mud outwardly in the tire axial direction since the trailing edges 10R are inclined such that widths of the grooves 9 located backwardly thereof increase outwardly in the tire axial direction. Thus, the second blocks 12 can dig into mud sufficiently and easily, leading to improve grip performance on soft terrain.

In this embodiment, the third blocks 13 have the trailing edges 10R inclined in a second direction with respect to the tire axial direction, wherein the second direction is an opposite direction to the first direction of the trailing edges 10R of the second blocks 12. That is, the trailing edges 10R of the third blocks 13 are preferably inclined in the second direction at third angles $\theta 3$ more than 5 degrees with respect to the tire axial direction. In some preferred embodiment, the third angles $\theta 3$ are less than 40 degrees.

The third blocks 13, for example, have the trailing edges 10R each inclined such that an axially inner side of the trailing edge 10R is located forwardly in the rotational direction R with respect to an axially outer side thereof. The third blocks 13 as such may improve grip performance on hard terrain since the trailing edges 10R substantially extend perpendicularly with respect to a direction of reacting force from the ground when cornering.

In some preferred embodiments, on the tread portion 2, a total number of the first blocks 11 is in a range of from 10% to 40% of a total number of the blocks 10, a total number of the second blocks 12 is in a range of from 30% to 50% of the total number of the blocks 10, and a total number of the third blocks 13 is in a range of from 30% to 50% of the total number of the blocks 10. Thus, the tread portion 2 as such may offer grip performance on both soft and hard terrain conditions in a good balance due to a suitable arrangement of different kinds of blocks that exhibit different grip performance.

In some preferred embodiments, on the tread portion 2, the total number of the first blocks 11 may be less than the total number of the second blocks 12, and may be less than the total number of the third blocks 13. That is, the total number of the first blocks 11 may be the least in the three kinds of blocks 10. Thus, the tread portion 2 may offer grip performance on both soft and hard terrain in a good balance.

In some preferred embodiments, on the tread portion 2, at least two different kinds of blocks 10 selected from a group of the first blocks 11, the second blocks 12 and the third blocks 13 may be provided on each of the crown region Cr, the middle regions Mi and the shoulder regions Sh. As used herein, the region to which each of the blocks 10 belongs is defined using the location of the center of gravity of each of the blocks 10. Thus, an excellent grip performance on both soft and hard terrain conditions can be offered when straight traveling ahead as well as cornering at a high level since the tread portion 2 is provided with at least two different kinds of blocks 10 that exhibit different grip characteristic.

In this embodiment, the crown region Cr is provided with three kinds of blocks 10, i.e., some first blocks 11, some second blocks 12 and some third blocks 13. In some preferred embodiments, in the crown region Cr, with respect to a number of the block 10 provided on the crown region Cr, a number of the first blocks 11 is in a range of from 20% to 60%, a number of the second blocks 12 is in a range of from 20% to 40%, and a number of the third blocks 13 is in a range of from 20% to 40%.

The crown region Cr as such may improve grip performance on both soft and hard terrain conditions when straight traveling ahead as well as cornering with a small camber angle in a good balance since the first blocks 11, the second blocks 12 and the third blocks 13 are arranged in a good balanced manner.

In this embodiment, the middle regions Mi are provided with some second blocks 12 and some third blocks 13, and are not provided with the first blocks 11. Alternatively, the middle regions Mi may be provided with some first blocks 11. In some preferred embodiments, in each of the middle regions Mi, with respect to a number of the blocks 10 provided on the middle region Mi, a number of the first blocks 11 is in a range of from 0% to 30%, a number of the second blocks 12 is in a range of from 30% to 60%, and a number of the third blocks 14 is in a range of from 30% to 60%.

The middle regions Mi may improve grip performance on soft terrain by the second blocks 12, and may improve grip performance on hard terrain when cornering by the third blocks 13. Thus, the middle region Mi, even in a transient state of the camber angle during cornering, may offer an excellent grip performance on both hard and soft terrain conditions.

In this embodiment, the shoulder regions Sh are provided with some of the first blocks 11, some of the second blocks 12 and some of the third blocks 13. In some preferred embodiments, in each of the shoulder regions Sh, with respect to a number of the blocks 10 provided on the shoulder region Sh, a number of the first blocks 11 is in a range of from 20% to 60%, a number of the second blocks 12 is in a range of from 20% to 40%, and a number of the third blocks 13 is in a range of from 20% to 40%.

The shoulder regions Sh as such may improve grip performance on both soft and hard terrain conditions when cornering with a large camber angle in a good balance since the first blocks 11, the second blocks 12 and the third blocks 13 are arranged in a good balance.

In some embodiments as stated above, the crown region Cr and the shoulder regions Sh are arranged three kinds of the blocks 10. Alternatively, some of the first blocks 11 and some of the second blocks 12 may be arranged on each of the regions to offer a tire 1 that is suitable particularly for running on soft terrain, for example. Alternatively, some of the first blocks 11 and some of the third blocks 13 may be arranged on each of the regions to offer a tire 1 that is suitable particularly for running on hard terrain, for example.

Further, in some embodiments as stated above, although the top surfaces 10a of the blocks 10 are configured as a flat plane, a recess may be provided on at least one of the top surfaces 10a of the blocks 10, for example.

Furthermore, it is not limited to the shape of the blocks 10 in a development view of the tread portion 2 as a substantially rectangular shape, various shapes that include a straightly extending trailing edge 10R can be employed.

While the particularly preferable embodiments in accordance with the present invention have been described in detail, the present invention is not limited to the illustrated embodiments, but can be modified and carried out in various aspects.

EXAMPLES

Two-wheeled vehicle tires, e.g. motorcycle tires for front wheel having the basic structure as illustrated in FIG. 1 with the arrangement of the blocks as illustrated in FIG. 2 were manufactured based on the details shown in Table 1, and then the performance was tested. The common specifications are as follows.

Displacement of motorcycle used for test: 450 cc
Tire size: 80/100-21
Rim size: 1.60×21
Inner pressure: 80 kPa Grip Performance Test on Soft Terrain:

A test driver drove the test motorcycle with the test tire on wet rough terrain test course, and then evaluated the grip performance by his feeling. The test results are shown in Table 1 using a score wherein Ref 1 is set to 100. The larger the score, the better the performance is.

Grip Performance Test on Hard Terrain:

A test driver drove the test motorcycle with the test tire on dry rough terrain test course, and then evaluated the grip performance by his feeling. The test results are shown in Table 1 using a score wherein Ref. 1 is set to 100. The larger the score, the better the performance is.

Tables 1 and 2 show the test results.

TABLE 1

|  | Ref. 1 | Ref. 2 | Ex. 1 | Ex. 2 | Ex. 3 | Ex. 4 |
|---|---|---|---|---|---|---|
| Crown region |  |  |  |  |  |  |
| Ratio of first blocks (%) | 100 | 0 | 50 | 25 | 25 | 0 |
| Ratio of second blocks (%) | 0 | 100 | 25 | 50 | 25 | 50 |
| Ratio of third blocks (%) | 0 | 0 | 25 | 25 | 50 | 50 |
| Middle regions |  |  |  |  |  |  |
| Ratio of first blocks (%) | 100 | 100 | 0 | 0 | 0 | 0 |
| Ratio of second blocks (%) | 0 | 0 | 50 | 50 | 50 | 50 |
| Ratio of third blocks (%) | 0 | 0 | 50 | 50 | 50 | 50 |
| Shoulder regions |  |  |  |  |  |  |
| Ratio of first blocks (%) | 100 | 0 | 40 | 40 | 40 | 40 |
| Ratio of second blocks (%) | 0 | 0 | 20 | 20 | 20 | 20 |
| Ratio of third blocks (%) | 0 | 100 | 40 | 40 | 40 | 40 |
| Grip performance on soft terrain (score) | 100 | 101 | 105 | 106 | 104 | 103 |
| Grip performance on hard terrain (score) | 100 | 100 | 105 | 104 | 106 | 103 |

TABLE 2

|  | Ex. 5 | Ex. 6 | Ex. 7 | Ex. 8 | Ex. 9 | Ex. 10 |
|---|---|---|---|---|---|---|
| Crown region |  |  |  |  |  |  |
| Ratio of first blocks (%) | 50 | 50 | 50 | 50 | 50 | 50 |
| Ratio of second blocks (%) | 25 | 25 | 25 | 25 | 25 | 25 |
| Ratio of third blocks (%) | 25 | 25 | 25 | 25 | 25 | 25 |
| Middle regions |  |  |  |  |  |  |
| Ratio of first blocks (%) | 17 | 17 | 34 | 0 | 0 | 0 |
| Ratio of second blocks (%) | 33 | 50 | 33 | 50 | 50 | 50 |
| Ratio of third blocks (%) | 50 | 33 | 33 | 50 | 50 | 50 |
| Shoulder regions |  |  |  |  |  |  |
| Ratio of first blocks (%) | 40 | 40 | 40 | 20 | 0 | 60 |
| Ratio of second blocks (%) | 20 | 20 | 20 | 40 | 40 | 20 |
| Ratio of third blocks (%) | 40 | 40 | 40 | 40 | 60 | 20 |
| Grip performance on soft terrain (score) | 104 | 105 | 102 | 105 | 104 | 103 |
| Grip performance on hard terrain (score) | 105 | 104 | 102 | 104 | 104 | 102 |

As apparent from the test results as shown in Table 1, it was confirmed that the example tires had improved grip performance on both soft and hard terrain conditions as compared with the reference example tires.

What is claimed is:

1. A two-wheeled vehicle tire comprising:
a tread portion having a designated rotational direction and being provided with a plurality of blocks;
the tread portion comprising a crown region with a tire equator wherein the crown region is a region that comes into contact with the ground when straight traveling and when cornering with a small camber angle, a pair of middle regions each located axially outwardly of the crown region wherein the middle regions are regions that come into contact with the ground when cornering and a pair of shoulder regions each located axially outwardly of the shoulder regions wherein the shoulder regions are regions that come into contact with the ground when cornering with a large camber angle;
each of the blocks having a top surface with a straightly extending trailing edge located backwardly in the rotational direction;
the blocks comprising at least three kinds of blocks including first blocks each having the trailing edge extending substantially in parallel with a tire axial direction, second blocks each having the trailing edge inclined in a first direction with respect to the tire axial direction such that an axially outer side of the trailing edge is located forwardly in the rotational direction with respect to an axially inner side thereof, and third blocks each having the trailing edge inclined in a second direction opposite to the first direction with respect to the tire axial direction such that an axially inner side of the trailing edge is located forwardly in the rotational direction with respect to an axially outer side thereof; and at least two different kinds of blocks selected from a group of the first blocks, the second blocks and the third blocks being provided on each of the crown region, middle regions and shoulder regions, wherein a total number of the first blocks is the least in the three kinds of blocks.

2. The two-wheeled vehicle tire according to claim 1, wherein a total number of the first blocks is in a range of from 10% to 40% of a total number of the blocks, a total number of the second blocks is in a range of from 30% to 50% of the total number of the blocks, and a total number of the third blocks is in a range of from 30% to 50% of the total number of the blocks.

3. The two-wheeled vehicle tire according to claim 1, wherein in the crown region, with respect to a number of the block provided on the crown region, a number of the first blocks is in a range of from 20% to 60%, a number of the second blocks is in a range of from 20% to 40%, and a number of the third blocks is in a range of from 20% to 40%.

4. The two-wheeled vehicle tire according to claim 1, wherein in each of the middle regions, with respect to a number of the blocks provided on the middle region, a number of the first blocks is in a range of from 0% to 30%, a number of the second blocks is in a range of from 30% to 60%, and a number of the third blocks is in a range of from 30% to 60%.

5. The two-wheeled vehicle tire according to claim 1, wherein in each of the shoulder region, with respect to a number of the blocks provided on the shoulder region, a number of the first blocks is in a range of from 20% to 60%, a number of the second blocks is in a range of from 20% to 40%, and a number of the third blocks is in a range of from 20% to 40%.

6. The two-wheeled vehicle tire according to claim 1, wherein the trailing edges of the first blocks are inclined at first angles in a range of less than 5 degrees with respect to the tire axial direction, the trailing edges of the second blocks are inclined at second angles in a range of more than 5 degrees with respect to the tire axial direction, and the trailing edges of the third blocks are inclined at third angles in a range of more than 5 degrees with respect to the tire axial direction.

7. The two-wheeled vehicle tire according to claim 1, wherein in each of a half tread region from the tire equator to a tread edge, the crown region is a region from the tire equator to a location less than 25% of a tread half width, the middle region is a region away 25% of the tread half width from the tire equator and within 75% of the tread half width from the tire equator, and the shoulder region is a region away 75% or more of the tread half width from the tire equator.

8. The two-wheeled vehicle tire according to claim 1, wherein each of the blocks has a height in a range of from 4 to 19 mm, and a distance between adjacent top surfaces of a pair of the blocks is in a range of from 8 to 30 mm.

9. The two-wheeled vehicle tire according to claim 1, wherein the tread portion has a land ratio in a range of from 5% to 35%.

10. A motorcycle comprising a two-wheeled vehicle tire according to claim 1 as a front tire.

11. The two-wheeled vehicle tire according to claim 1, wherein the top surface of each of the blocks has a circumferential length is greater than an axial width thereof.

12. The two-wheeled vehicle tire according to claim 1, wherein three different kinds of blocks selected from the group of the first blocks, the second blocks and the third blocks are provided on the crown region.

13. The two-wheeled vehicle tire according to claim 1, wherein only two different kinds of blocks selected from the group of the first blocks, the second blocks and the third blocks are provided on the middle regions.

14. The two-wheeled vehicle tire according to claim 13, wherein the two different kinds of blocks are the second blocks and the third blocks.

15. The two-wheeled vehicle tire according to claim 1, wherein a number of the blocks provided on each shoulder region is smaller than a number of the blocks provided on the crown region and a number of the block provided on each middle region.

16. A two-wheeled vehicle tire comprising:

a tread portion having a designated rotational direction and being provided with a plurality of blocks;

the tread portion comprising a crown region with a tire equator wherein the crown region is a region that comes into contact with the ground when straight traveling and when cornering with a small camber angle, a pair of middle regions each located axially outwardly of the crown region wherein the middle regions are regions that come into contact with the ground when cornering and a pair of shoulder regions each located axially outwardly of the middle regions wherein the shoulder regions are regions that come into contact with the ground when cornering with a large camber angle;

each of the blocks having a top surface with a straightly extending trailing edge located backwardly in the rotational direction;

the blocks comprising at least three kinds of blocks including first blocks each having the trailing edge extending substantially in parallel with a tire axial direction, second blocks each having the trailing edge inclined in a first direction with respect to the tire axial direction such that an axially outer side of the trailing edge is located forwardly in the rotational direction with respect to an axially inner side thereof and third blocks each having the trailing edge inclined in a second direction opposite to the first direction with respect to the tire axial direction such that an axially inner side of the trailing edge is located forwardly in the rotational direction with respect to an axially outer side thereof; and at least two different kinds of blocks selected from a group of the first blocks, the second blocks and the third blocks being provided on each of the crown region, middle regions and shoulder regions, wherein a total number of the first blocks is in a range of from 10% to 40% of a total number of the blocks, a total number of the second blocks is in a range of from 30% to 50% of the total number of the blocks, and a total number of the third blocks is in a range of from 30% to 50% of the total number of the blocks.

\* \* \* \* \*